(12) United States Patent
Roedseth

(10) Patent No.: US 6,630,045 B1
(45) Date of Patent: Oct. 7, 2003

(54) COMBINED BEAD LOADING AND APEX APPLICATION SYSTEM

(75) Inventor: John Kolbjoern Roedseth, Grand Duchy of Luxembourg (NO)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/913,710

(22) PCT Filed: Mar. 25, 1999

(86) PCT No.: PCT/US99/06284

§ 371 (c)(1),
(2), (4) Date: Aug. 17, 2001

(87) PCT Pub. No.: WO00/58077

PCT Pub. Date: Oct. 5, 2000

(51) Int. Cl.$^7$ ............................................. B29D 30/18
(52) U.S. Cl. ..................... 156/131; 156/130.7; 156/133; 156/136
(58) Field of Search ................. 156/136, 422, 156/111, 131, 132, 135, 398, 403, 406.2, 396, 133, 130.7

(56) References Cited

U.S. PATENT DOCUMENTS

| | | | |
|---|---|---|---|
| 1,759,669 A | * 5/1930 | Stevens | 156/136 |
| 3,654,007 A | * 4/1972 | Winstanley et al. | 156/132 |
| 3,787,263 A | 1/1974 | Yonekawa et al. | 156/136 |
| 4,087,298 A | 5/1978 | Mangun et al. | 156/136 |
| 4,148,680 A | 4/1979 | Harding | 156/403 |
| 4,298,421 A | 11/1981 | Pirovano | 156/460 |
| 4,319,943 A | * 3/1982 | Bayuga | 156/136 |
| 4,354,892 A | 10/1982 | Tarantola et al. | 156/398 |
| 4,410,389 A | 10/1983 | Cole et al. | 156/398 |
| 4,933,034 A | 6/1990 | Kokubu et al. | 156/136 |
| 5,080,738 A | 1/1992 | Araki et al. | 156/136 |
| 5,100,497 A | 3/1992 | Moody et al. | 156/460 |
| 5,141,590 A | * 8/1992 | Siegenthaler | 156/422 |
| 5,203,938 A | 4/1993 | Moody et al. | 156/136 |
| 5,282,912 A | 2/1994 | Kokubu et al. | 156/136 |
| 5,294,275 A | 3/1994 | Kawaguchi et al. | 156/136 |
| 5,328,533 A | 7/1994 | Yasuno et al. | 156/136 |
| 5,403,418 A | 4/1995 | Kikuchi et al. | 156/136 |
| 5,632,836 A | 5/1997 | Verschoor et al. | 156/111 |
| 6,264,780 B1 | * 7/2001 | Iwanaga et al. | 156/136 |

FOREIGN PATENT DOCUMENTS

| | | |
|---|---|---|
| EP | 0240973 | 10/1987 |
| EP | 0854030 | 7/1998 |
| GB | 1468717 | 3/1977 |

* cited by examiner

*Primary Examiner*—Geoffrey L. Knable
(74) *Attorney, Agent, or Firm*—David L. King (57) ABSTRACT

A bead apex subassembly (2) which is formed simultaneously to the formation of a tire carcass (10) but independent of and spaced near the tire building machine (100) is disclosed. The subassembly (2) is transferred to the tire building drum (5) preassembled.

5 Claims, 8 Drawing Sheets

COMBINED BEAD LOADING AND APEX APPLICATION SYSTEM

TECHNICAL FIELD

This invention relates to a tire component, more particularly, novel bead-apex subassembly and a method of employing the bead-apex subassembly into a tire carcass.

BACKGROUND OF THE INVENTION

The manufacture of tires involves numerous components and requires applying these tire components in a somewhat ordered sequence to form an assembly of components known as a "tire carcass" to which a belt package and a rubber tread is applied to make a green tire which is then vulcanized to finish the produce we commonly refer to as a "tire".

The assembly of tire components, specifically a tubeless type tire, include a liner which forms an air impervious barrier to contain the air under pressure in the air chamber of a pneumatic tire, one or more plies reinforced by cords, a chaffer compound applied in two strips, two annular bead cores and a pair of apexes which are also generally applied in strips. The bead cores generally are applied over the chaffers. Other components such as sidewall strips, run-flat inserts, shoulder gum strips, and fabric toe guards can also be applied to form the tire carcass.

This stage of the tire building process is commonly referred to as the "first stage" of the tire building process. The components are applied over a cylindrical building drum that usually includes turn-up bladders and a center bladder to convert the subassembly of tire components from a cylindrical shape to a toroidal shape.

All or almost all the rubber components are usually applied to the building drum in strips. Each strip is wound onto the drum generally requiring a 360° revolution, the ends of the strip are then spliced together.

To make the assembly process more efficient, it is desirable to preassemble many of these tire component strips. In U.S. Pat. No. 5,762,740 a method of laminating several of the components into a subassembly of carcass components is taught. This greatly improves the efficiency of the first stage building process.

The bead and apex have also been combined in a subassembly as is taught in U.S. Pat. No. 4,933,034. The apex is applied in a strip outwardly extending from the radially outer or peripheral surface of the annular bead core and then stitched at the ends of the strip. These components, once reassembled, must be stored in such a way that the apex is not damaged when it is subsequently brought to the first stage tire building machine.

Such prior art subassemblies of an apex strip to a bead core have the apex radially extending in a manner that requires the carcass to be inflated in the central region to bring the apex into contact with the carcass. After the carcass is inflated, a turn-up of the ply ends and the sidewall rubber is made in a step commonly referred to as the "inflated turn-up". This sequencing of forming the carcass requires a more complex method of manufacturing the carcass because the components and subassemblies are not applied to the tire building drum in a flat state.

An object of the present invention is to avoid or eliminate the storage problems found in making a bead-apex subassembly.

Another object of the invention is to permit the carcass to be built with a bead-apex subassembly without requiring an inflated turn-up.

Another object of the invention is to build the bead apex subassembly at, but not on the first stage building drum, as the carcass is being constructed.

DISCLOSURE OF THE INVENTION

SUMMARY OF THE INVENTION

The present invention method of making a tire carcass (10) at a first stage tire building machine (100) has the steps of: a) cylindrically forming one or more strips of tire components (20, 40, 50, 60, 70) around a first stage tire building drum (5), the first stage tire building drum (5) having an axis of rotation; b) forming two annular bead-apex subassemblies (2) at a location in proximity to and spaced from the building drum (5), the subassemblies (2) being formed by applying an elastomeric apex strip (30) to a peripheral or radially outer surface (12A) of an annular bead core (12) having an axis of rotation; c) aligning the axis of rotation of each bead-apex subassembly (2) with the axis of rotation of the tire building drum (5); d) transferring each bead-apex subassembly (2) onto the tire building drum (5); e) applying any additional tire components (20, 40, 50, 60, 70) to form the tire carcass (10) prior to toroidally shaping the carcass (10). Preferably, the step of forming the two bead-apex subassemblies (2) occurs simultaneously with the cylindrically forming the carcass. (10).

In the preferred method, the step of forming two annular bead-apex subassemblies (2) further includes the steps of placing each bead core (12) on a rotatable support (80) in proximity to but separated from the tire building drum (5) and applying one elastomeric apex strip (30) onto a radially outer surface (12A) of each bead core (12) as the support (80) is rotated. Most preferably, the step of applying one elastomeric strip (30) to each bead core (12) includes the step of orienting the elastomeric apex strip (30) parallel to the axis of the bead core (12) relative to the width (W) of the strip. The step of applying one elastomeric. strip (30) to each bead core (12) includes the steps of stitching the apex (30) to the bead core (12), splicing ends (30A, 30B) of the apex (30) to form the annular bead-apex subassembly (2).

The step of aligning the bead-apex subassembly (2) axis with the tire building drum (5) axis further includes the steps of moving the support (80) to axially align the bead-apex subassembly (2) with tire building drum (5) axis.

The step of transferring the bead-apex subassembly (2) further includes the steps of removing the annular bead-apex subassembly (2) from the support (80) while maintaining axial alignment with the tire building drum (5), moving the support (80) to a location spaced from the tire building drum (5) and moving each bead-apex subassembly (2) onto the tire building drum (5).

The method of forming an annular bead-apex subassembly (2) as an intermediate article of manufacture to be used at a first stage tire building machine (100), the method comprising the steps of: a) placing an annular bead core (12) on to a support (80), the bead core (12) having an axis of rotation; b) applying an elastomeric strip of apex (30) onto a radially outer surface (12A) of the bead core (12), the strip (30) being applied with the width (W) of the strip (30) being oriented parallel to the axis of the bead core (12); c) stitching the strip (30) to the bead core (30); and d) splicing ends (30A, 30B) of the strips (30), thus, forming the annular bead-apex subassembly (2) as an intermediate article of manufacture to be used at a first stage tire building machine (100).

The resultant methods can yield a bead-apex subassembly (2) as an intermediate article of manufacture having an annular bead core (12) having a radially outer surface (12A); and an elastomeric strip of apex (30) affixed to the radially outer surface (12A) of the bead core (12) at a first end (31) of the strip (30) along a radially inner surface (33), the distances between the first end (31) and a second end (32), defining the width (W) of the strip (30), the width (W) of the strip (30) being substantially oriented parallel to the axis of the bead core (12) along the radially inner surface (33).

DEFINITIONS

For ease of understanding this disclosure, the following items are disclosed:

"Apex" means an elastomeric filler located radially above the bead and interposed between the plies and the ply turn-up.

"Axial" and "axially" means the lines or directions that are parallel to the axis of rotation of the tire.

"Bead" means that part of the tire comprising an annular tensile member commonly referred to as a "bead core" wrapped by ply cords and shaped, with or without other reinforcement elements such as flippers, chippers, apexes, toe guards and chafers, to fit the design rim.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Carcass" means an unvulcanized laminate of tire ply material and other tire components cut to length suitable for splicing, or already spliced, into a cylindrical or toroidal shape. Additional components may be added to the carcass prior to its being vulcanized to create the molded tire.

"Casing" means the tire carcass and associated tire components excluding the tread.

"Chafers" refers to narrow strips of material placed around the outside of the bead to protect cord plies from the rim, distribute flexing above the rim, and to seal the tire.

"Circumferential" means lines or directions extending along the perimeter of the surface of the annular tread perpendicular to the axial direction.

"Cord" means one of the reinforcement strands of which the plies in the tire are comprised.

"Equatorial Plane (EP)" means the plane perpendicular to the tire's axis of rotation and passing through the center of its tread.

"Innerliner" means the layer or layers of elastomer or other material that form the inside surface of a tubeless tire and that contain the inflating fluid within the tire.

"Insert" means an elastomeric member used as a stiffening member usually located in the sidewall region of the tire.

"Ply" means a continuous layer of rubber-coated parallel cords.

"Radial" and "radially" mean directions radially toward or away from the axis of rotation of the tire.

"Radial Ply Tire" means a belted or circumferentially-restricted pneumatic tire in which at least one layer of ply has the ply cords extend from bead to bead at cord angles between 65° and 90° with respect to the equatorial plane of the tire.

"Shoulder" means the upper portion of sidewall just below the tread edge.

"Sidewall" means that portion of a tire between the tread and the bead.

"Tread" means a rubber component which when bonded to a tire carcass includes that portion of the tire that come into contact with the road when the tire is normally inflated and under normal load.

"Tread Width" means the arc length of the tread surface in the axial direction, that is, in a plane parallel to the axis of rotation of the tire.

DETAILED DESCRIPTION OF THE INVENTION

Figure 1:
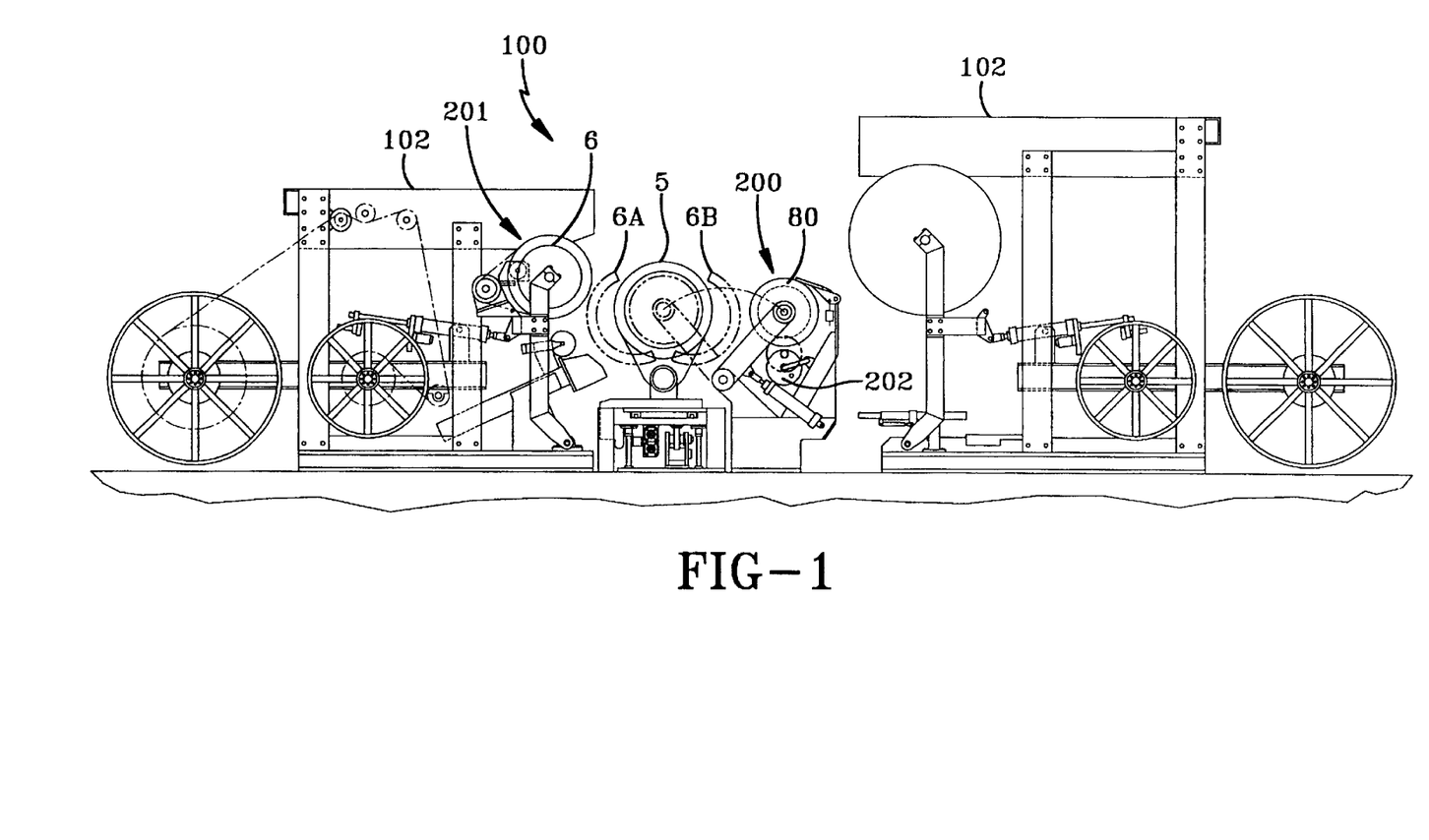
FIG. 1 is a side view of a first stage tire building machine (100).
Figure 2:
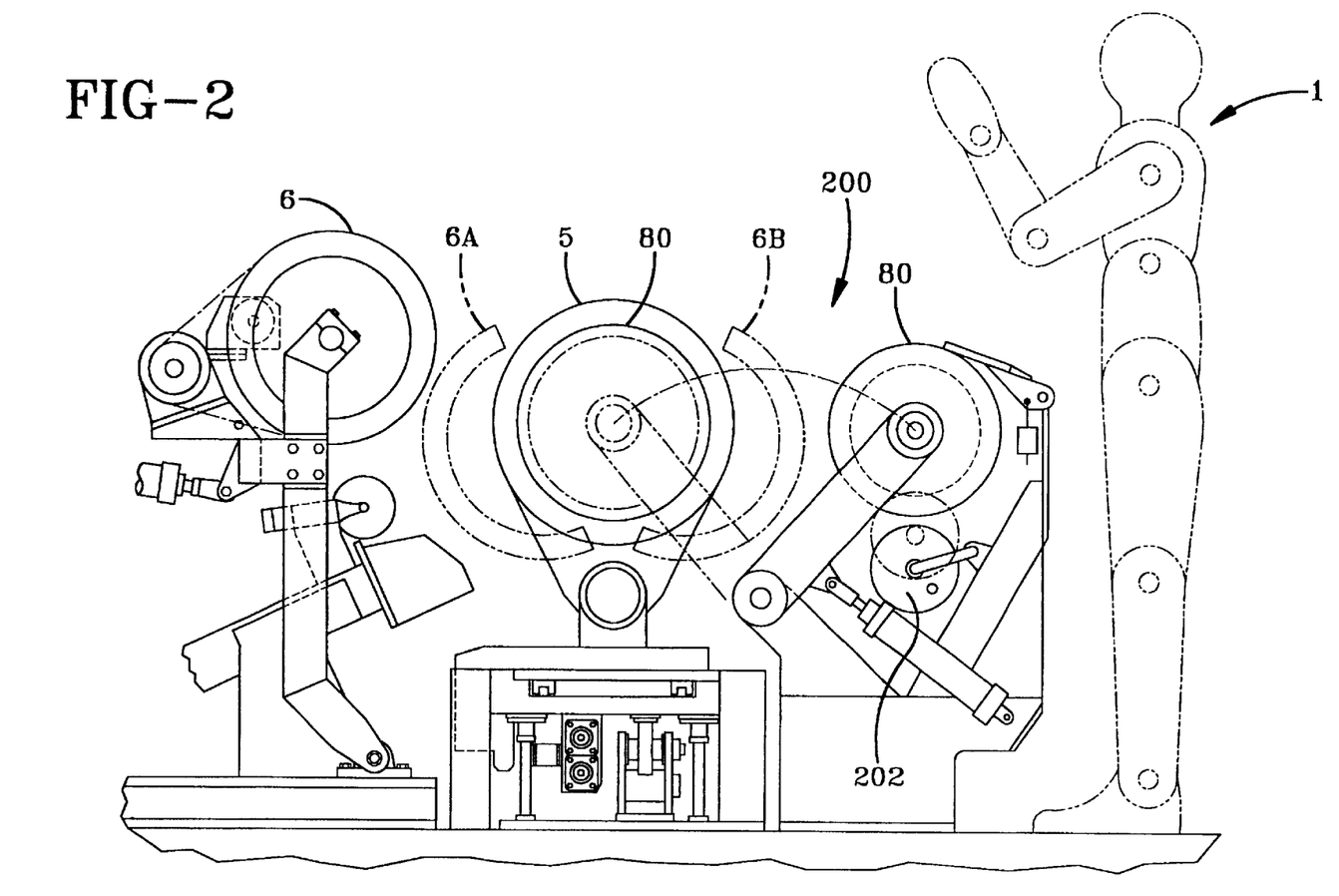
FIG. 2 is a side view of the building drum mechanism (5) and bead-apex subassembly forming station (200).

With reference to FIG. 1, a side view of an exemplary tire building machine (100) is illustrated. The machine (100) has a tire building drum (5). The building drum (5) has an axis of rotation permitting the drum to rotate. Preferably, the drum is cantilevered or attached to a frame at one end leaving the opposite end free to have annular components such as a bead core pass over the drum(5). The drum (5) has inflatable bladders (5A) which are used to toroidally shape the central portion of a carcass and to inflate and, thereby, make the turn-up ends of the ply wrap about the bead cores.

At one or both ends of the machine (100) are various mechanisms (102) for supplying strips of elastomeric components used to make a tire carcass. These mechanisms are often called "let-off devices" which feed strips of tire material to the building drum (5).

In close proximity to the building drum (5) is a mechanism called an "automatic bead loader". The bead loader (6) has a pair of annular members that can be formed by two semi-circular half rings (6A, 6B). The pair of bead loaders (6) are pivotally moveable away from and into axial alignment with the tire building drum. The bead loaders (6) are modified to be an integral part of the subassembly transfer mechanism (201).

The pair of bead loaders (6) have been modified to move axially relative to each other. This feature enables the bead loaders to move axially inwardly over a pair of bead-apex subassembly forming annular supports (80) each support (80) is rotatable about its own axis of rotation and pivotably moveable into and out of axial alignment with the axis of the building drum (5).

The tire building machine (100) of FIG. 1 can be fully automated or may require an operator (1) to manually cut and splice the components as they are applied to the tire building drum (5).

To better appreciate the tire building process, the sequence of building an exemplary tire is explained below. The components listed below can be varied for a particular tire construction. Some tires have more components than others. For example, some tires of the tube type may not require a liner (50). It is, therefore, understood that the exemplary tire construction is simply to be representative of a typical tire carcass.

A tire liner (50) is first applied to the tire building drum (5). Then, two shoulder gum strips (40) may be placed onto the liner at spaced locations axially inward of the edges of the liner (50). The shoulder gum strips (40) acts as a rubber reinforcement in the shoulder of the tire carcass.

A hard rubber chafer component (60) is then applied at each of the edges of liner (50). The chafer (60) are positioned axially to provide a tough rubber reinforcement between the tire and the rim flange of the wheel and is accordingly located in the bead region of the finished tire.

A sidewall component (70) can be attached to and slightly overlapping each of the chafers (60).

Optionally, to build an outlined white letter tire or a whitewall tire, a whitewall strip (72) and a cover strip (74) may be added to the sidewall areas (70) of the assembly (10). Additionally, runflat inserts (76) may be added in the sidewall region of the assembly. This is particularly useful in run-flat tire construction.

The above description includes most of the unreinforced elastomeric components required to build a tubeless tire.

Overlying these components may be one or more plies (20).

Each of the components described above requires, if applied separately, a rotation of the building drum (5) to form the component into a cylindrical shape. Alternatively, these components may be fed to the tire building machine (100 as one or more subassemblies. In either case, the ends of the components or subassemblies must be spliced together.

The prior art method of tire assembly would next require that the bead cores (12) be slid over an end of the building drum (5) and positioned axially at a predetermined axial location generally above the chafers (60). Then, an apex filler strip (30) would be placed with an end onto bead core (12) and extending axially inwardly relative to the bead cores (12). The apex filler strips (30) would then be cut to length and the cut ends (30A, 30B) spliced together and then stitched onto the underlying bead core (20) and tire assembly. The application of the apex filler strip (30) required additional rotation of the building drum (5) and because the tire cacass is assembled in layers, each layer of strips must be accomplished sequentially.

The use of preassembled bead-apex subassemblies (2) can eliminate the time needed to rotate the drum (5). However, the need to store and maintain such subassemblies is an added cost in itself.

The present invention teaches the forming of the bead-apex subassembly (2) at or in proximity to the tire building machine (100) yet not on the building drum (5). This enables the subassemblies (2) to be formed without affecting or being limited to the building sequence of the rest of the carcass (10).

This means that the elastomeric apex strips (30) can be applied to the bead core (12) as shown in FIGS. 1–6.

Figure 3:
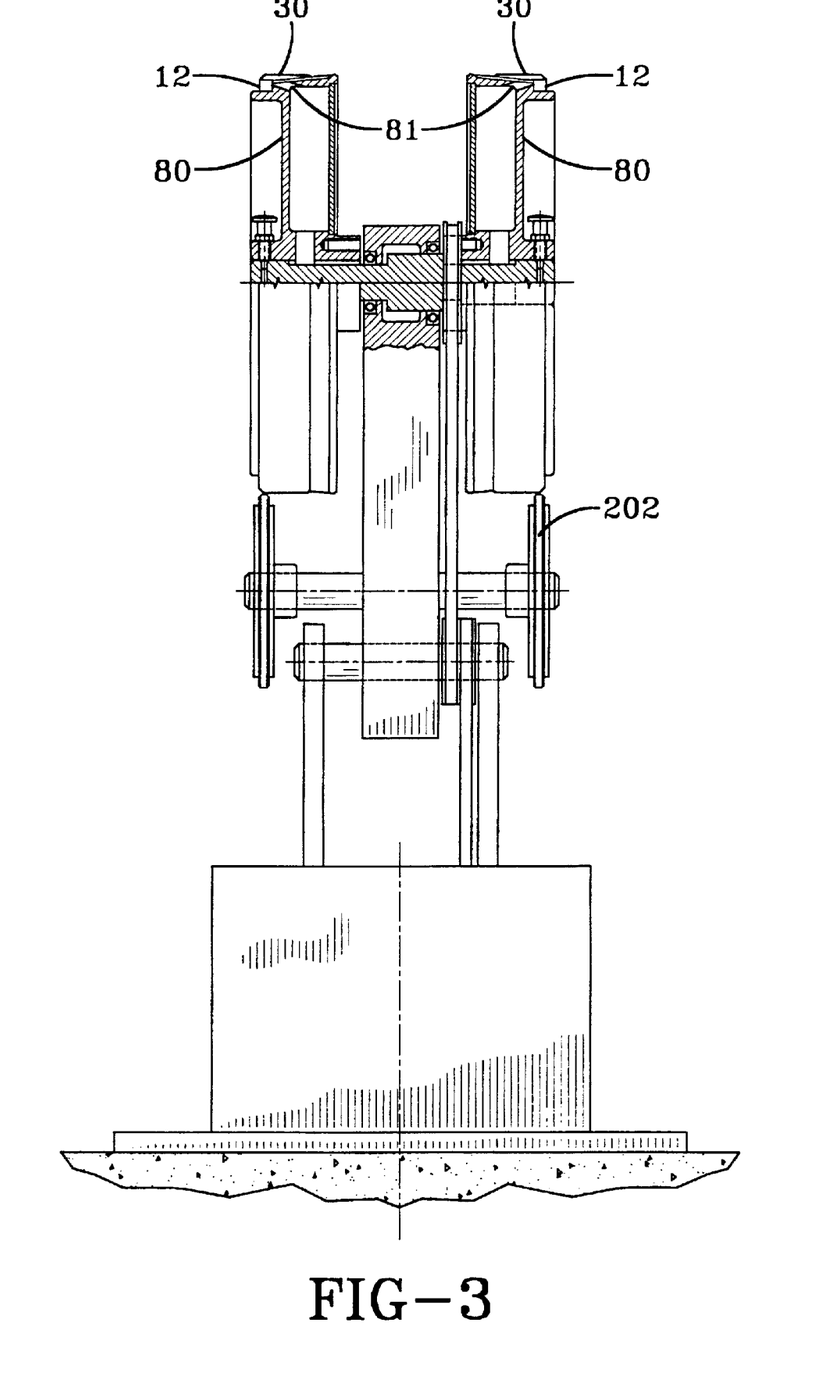
FIG. 3 is an end view of the bead apex subassembly forming mechanism (200) with a pair of apex stichers shown.
Figure 4:
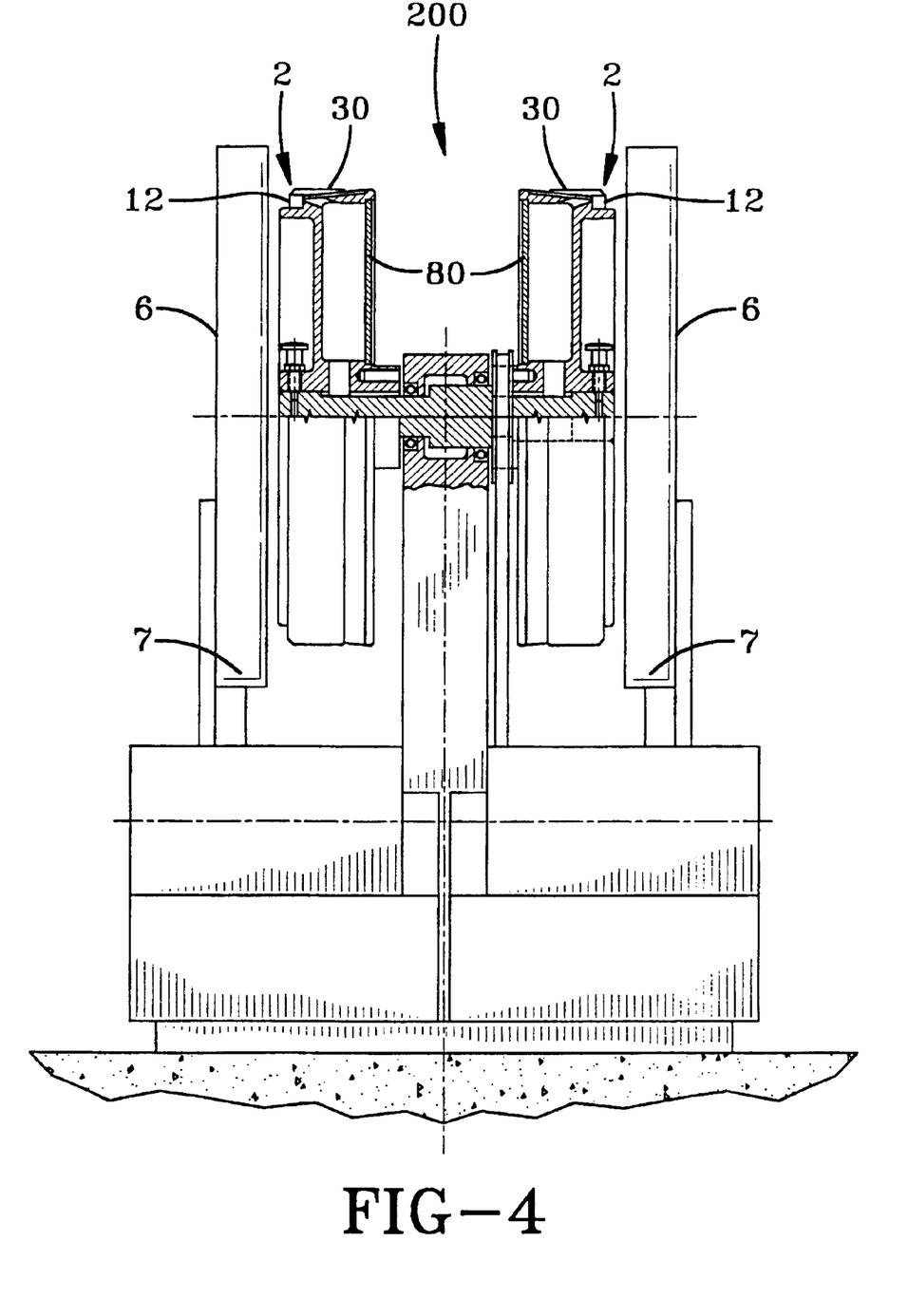
FIG. 4 is an end view of the bead-apex subassembly forming mechanism (200) with a pair of transfer means (202) being shown.
Figure 5:
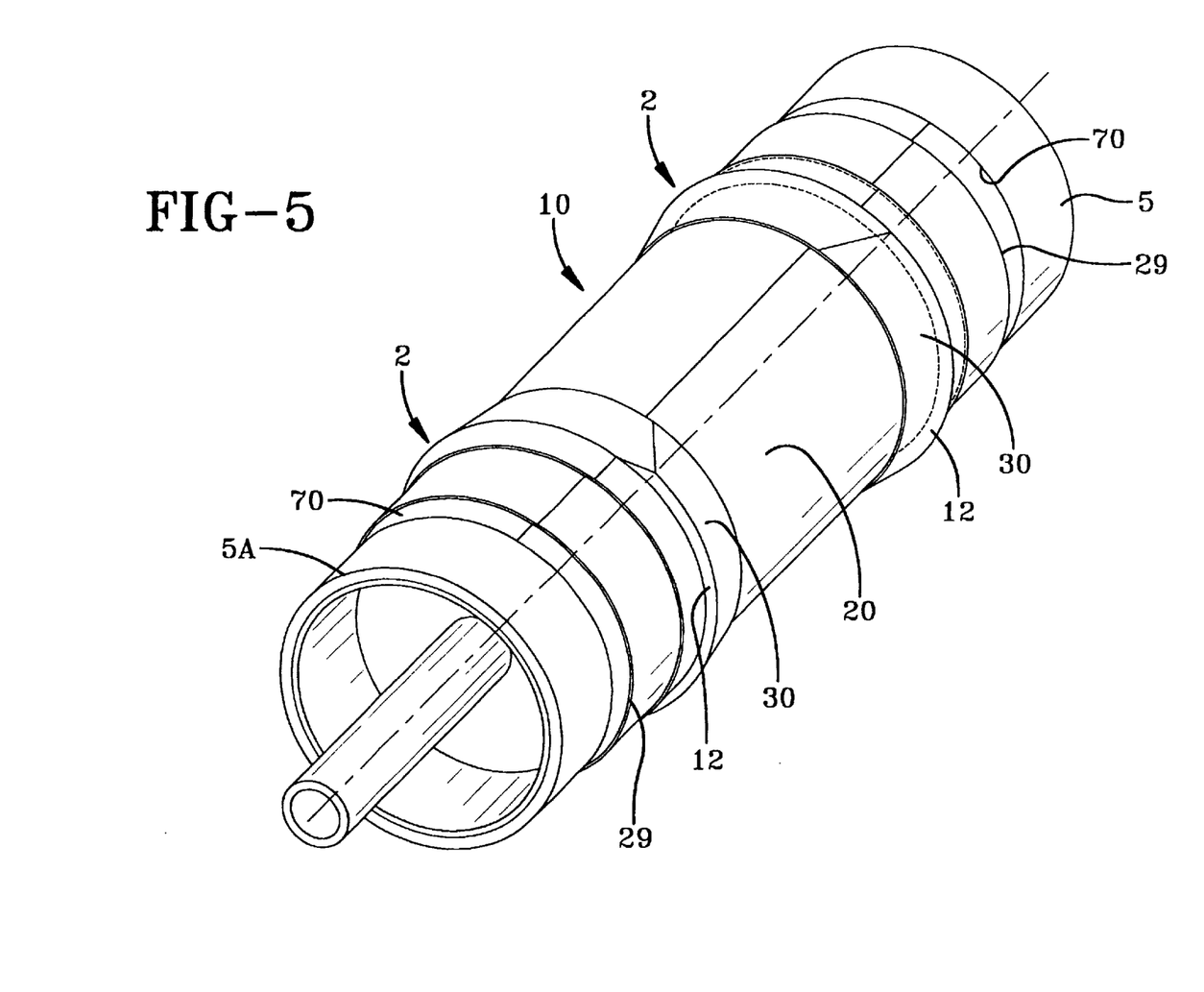
FIG. 5 is a perspective view of the transfer means (202) transferring the bead apex subassemblies (2) over the building drum (5).
Figure 6:
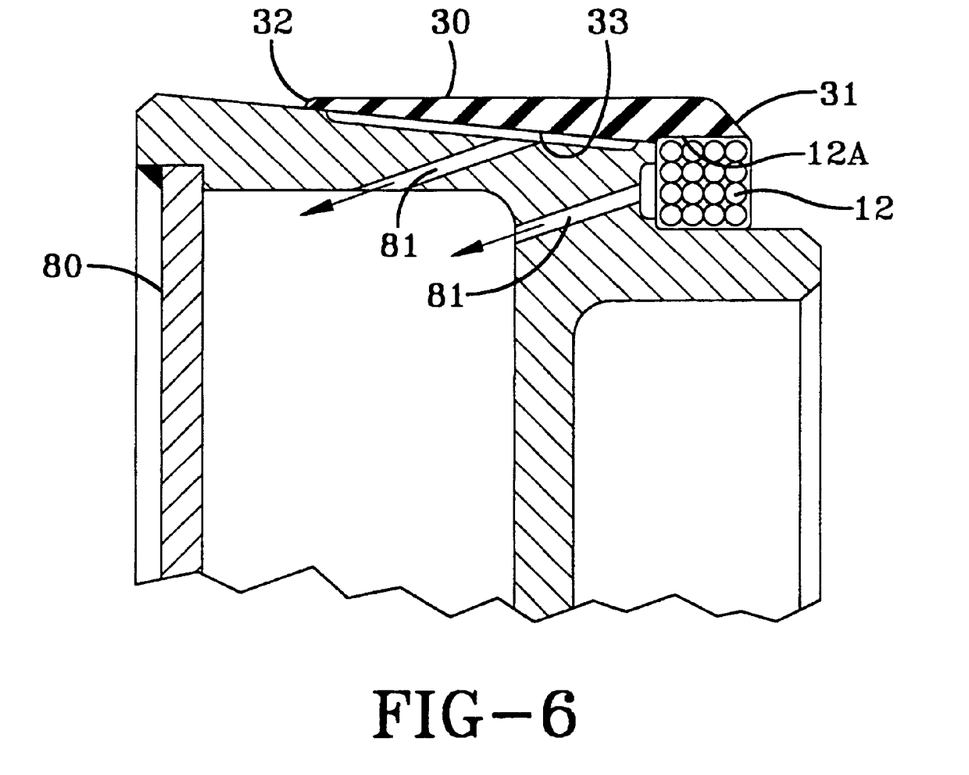
FIG. 6 is an enlarged view of the cross-section of the bead apex subassembly (2).
Figure 7:
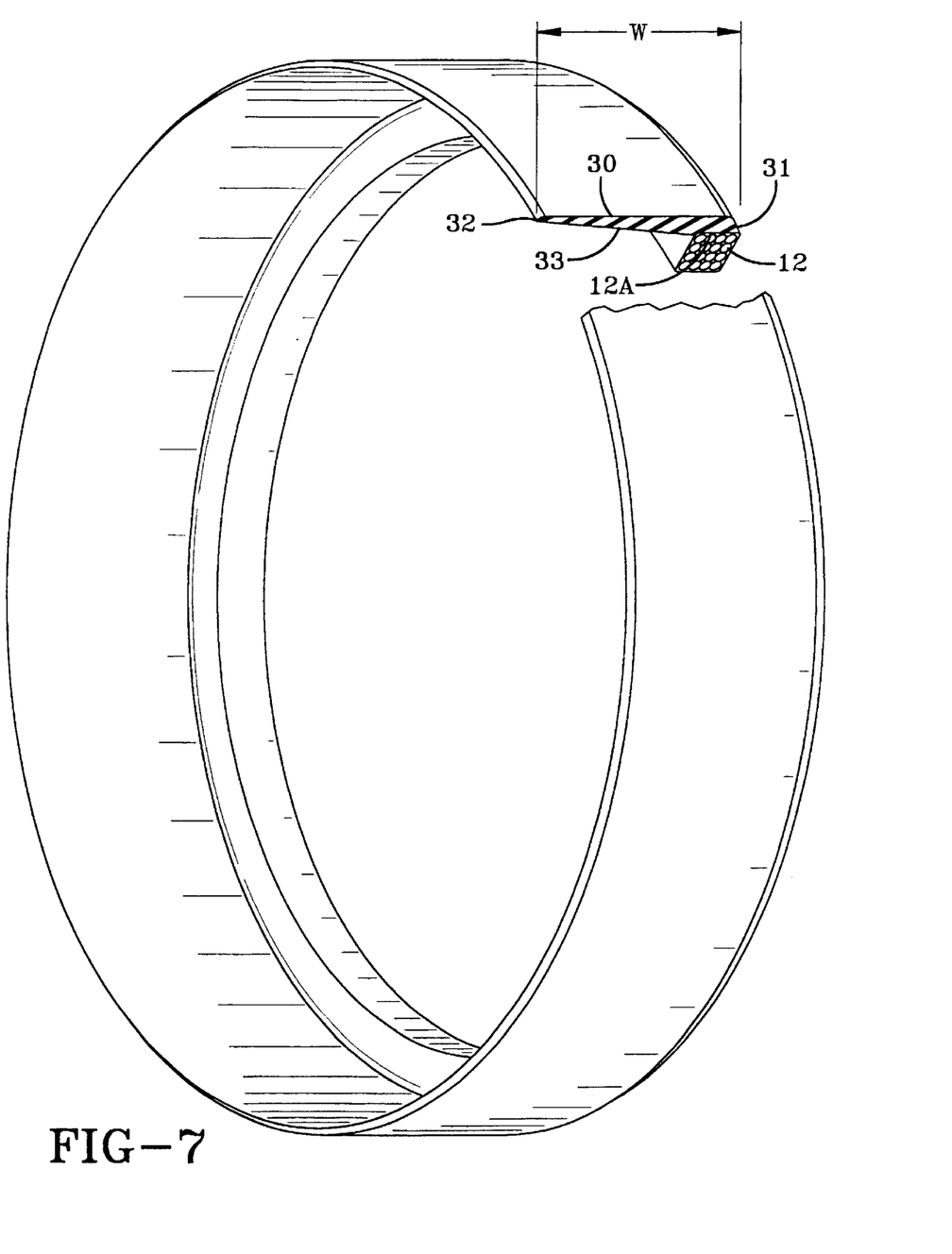
FIG. 7 is a perspective view of the formed bead apex subassembly (2).

In the preferred apparatus (200), the apex strip (30) is applied onto a radially outer surface (12A) of a bead core (12) and the rotatable support (80) to which the bead core (12) is attached. In the preferred embodiment, the apex strip (30) is applied horizontally relative to the width (W) of the strip (30). Once applied, the longitudinal ends (30A, 30B) of the strip (30) are cut to length and spliced, preferably the strips (30) can be precut to length prior to being applied to the bead core (12) and support (80). Then as shown in FIG. 3, a pair of stitcher wheels (204) presses firmly against the end (31) of the uncured apex strip (30) attaching it to the bead core (12). As illustrated, each apex strip (30) extends axially inwardly from each bead core (12) as shown in FIG. 3.

The bead-apex subassembly (2) is then pivoted into axially alignment with the axis of the tire building drum (5). Similarly, the bead loaders (6) are positioned into axial alignment with the tire building drum (5). Once aligned, the bead loaders (6) move axially inwardly over the bead core (12). In the preferred apparatus, the support (80) has a plurality of small holes (81) underlying the apex strip (30). These holes (81) are connected to an air vacuum and pressure line. A vacuum is used to hold the strip (30) in position at least until it is stitched to the bead core (12). Once the bead loaders (6) are in position to transfer the subassembly (2) from the support (80), air pressure can be supplied to the holes (81) helping to release the apex strip (30) from the support (80). At this point, the bead loaders (6), which preferably include a magnetic ring (7), pick up the bead apex subassembly (2) automatically. Alternatively, the bead loaders (6) may use a vacuum or other means to grasp the bead-apex subassembly (2). Once sped, the bead loaders (6) each holding a bead-apex subassembly (2) can move axially apart, then the unloaded rotatable support (80) are pivoted out of axial alignment of the building drum (5). This frees the bead loaders (6) to move over an end (5A) of the building drum (5) to position the beadapex subassemblies (2) precisely onto the cylindrically-shaped carcass (10) at the location needed to position the bead apex subassembly (2). The bead loader (6) then releases the bead apex subassembly (2) on the drum (5) while the drum bead locks expands radially under the bead cores (12) locking them into position. Once the bead-apex subassembly (2) is transferred to the building drum (5), the bead loaders (6) are moved back away from the building drum (5).

Figure 8:
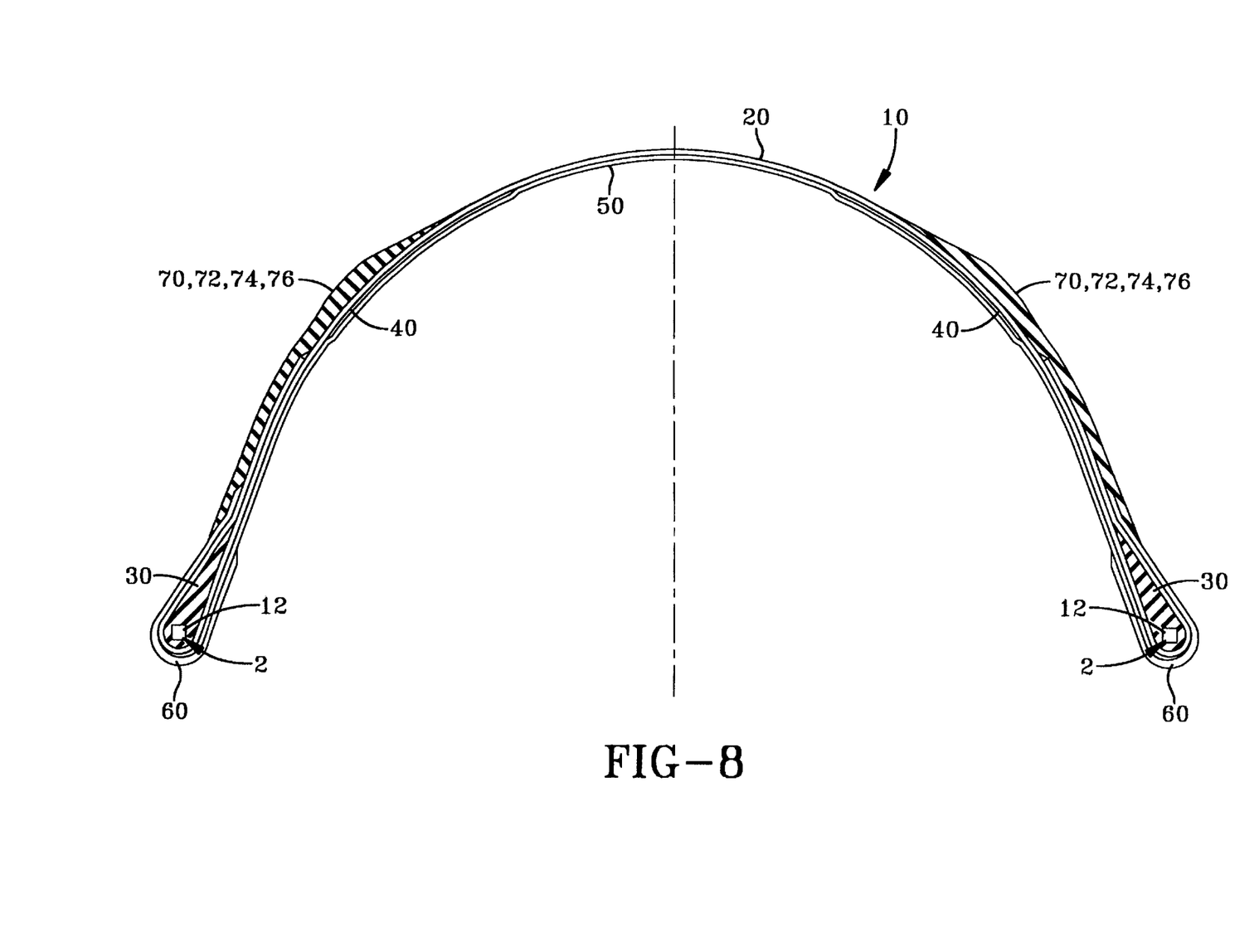
FIG. 8 is a cross-sectional view of the toroidally-shaped tire carcass (10).

The tire building sequence then inflates the turn-up bladders and stitched the turn-up ends onto the carcass (10). The central portion of the drum (5) can be inflated toroidally as shown in FIG. 8.

One unique feature of the preferred method of forming the bead-apex subassembly (2) is that the apex (30) lies horizontally on top of the bead core (12). This feature is unusual in terms of the cantilevering of the uncured apex strip (12). Storage and preassembly away from the tire building machine (100) would be very difficult. However, because the subassembly (2) is formed simultaneously with the carcass assembly (10), it can be directly transferred onto the building drum (5) with no difficulties in handling or storage.

This method of assembly can speed up the time required to form a carcass (10) by about 16%. This is a sizable cost savings that could not be fully realized on tire building machines (100) that did not have an inflated turn-up capability.

The above disclosed process can be automatic, if required, with the application of the apexes preformed by a device and cut to length without the need for an operator. Alternatively, the process can be semi-automatic requiring an operator cut the apex to length.

What is claimed is:

1. A method of making a tire carcass at a first stage tire building machine, the method comprising the steps of:
   a) cylindrically forming one or more strips of tire components around a first stage tire building drum, the first stage tire building drum having an axis of rotation; while simultaneously forming two annular bead apex subassemblies at a location in proximity to and spaced from the building drum, the subassemblies being formed by applying an elastomeric apex strip to a radially outer surface of an annular bead core having an axis of rotation; the apex strip when applied to the bead core being oriented parallel to the axis of the bead core relative to the width (W) of the strip;
   b) aligning the axis of rotation of each bead-apex subassembly with the axis of rotation of the tire building drum;
   c) transferring each bead-apex subassembly onto the tire building drum;
   d) applying any additional tire components to form the tire carcass prior to toroidally shaping the carcass.

2. The method of claim 1 wherein the step of forming two annular bead-apex subassemblies further includes the steps of placing each bead core on a rotatable support in proximity to but separated from the tire building drum and applying one elastomeric apex strip onto a radially outer surface of each bead core as the support is rotated.

3. The method of claim 2 wherein the step of applying one elastomeric apex strip to each bead core includes the steps of stitching the apex to the bead core, and splicing ends of the apex to form the annular bead-apex subassembly.

4. The method of claim 3 wherein the step of aligning the bead-apex subassembly axis with the tire building drum further includes the steps of moving the support to axially align the bead-apex subassembly with tire building drum axis.

5. The method of claim 4 wherein the step of transferring the bead-apex subassembly further includes the steps of removing the annular bead-apex subassembly from the support while maintaining axial alignment with the tire building drum, moving the support to a location spaced from the tire building drum and moving each bead-apex subassembly onto the tire building drum.

* * * * *